United States Patent [19]
Schewe

[11] Patent Number: 4,742,413
[45] Date of Patent: May 3, 1988

[54] MAGNETIC MEMORY INCLUDING A RECORDING DEVICE AND MEDIUM THAT CAN BE MAGNETIZED VERTICALLY

[75] Inventor: Herbert Schewe, Herzogenaurach, Fed. Rep. of Germany

[73] Assignee: Siemens Akteingesellschaft, Berlin and Munich, Fed. Rep. of Germany

[21] Appl. No.: 941,392

[22] Filed: Dec. 15, 1986

[30] Foreign Application Priority Data

Dec. 20, 1985 [DE] Fed. Rep. of Germany ....... 3545361
Feb. 7, 1986 [DE] Fed. Rep. of Germany ....... 3603903

[51] Int. Cl.[4] ............................................. G11B 5/147
[52] U.S. Cl. ..................................... 360/126; 360/119
[58] Field of Search ...................... 360/119, 125, 126

[56] References Cited

U.S. PATENT DOCUMENTS 3,639,699  2/1972  Tiemann .............................. 179/100

FOREIGN PATENT DOCUMENTS

| | | |
|---|---|---|
| 0012912 | 7/1980 | European Pat. Off. . |
| 0012910 | 7/1980 | European Pat. Off. . |
| 0054269 | 6/1982 | European Pat. Off. . |
| 0071489 | 2/1983 | European Pat. Off. . |
| 0120413 | 10/1984 | European Pat. Off. . |
| 0135739 | 4/1985 | European Pat. Off. . |
| 0166818 | 1/1986 | European Pat. Off. . |
| 2658956 | 6/1976 | Fed. Rep. of Germany . |
| 2428886 | 1/1980 | France . |
| 52-84722 | 7/1977 | Japan . |
| 55-22276 | 2/1980 | Japan .................................. 360/126 |
| 58-88812 | 5/1983 | Japan . |
| 58-199422 | 11/1983 | Japan . |
| 59-65917 | 4/1984 | Japan . |
| 59-77625 | 5/1984 | Japan . |
| 59-231721 | 12/1984 | Japan . |
| 59-231717 | 12/1984 | Japan . |
| 60-58511 | 4/1985 | Japan . |
| 2149186 | 6/1985 | United Kingdom . |

OTHER PUBLICATIONS

IEEE Trans. Magn., vol. Mag 16 (Jan. 80), pp. 71–76.
IEEE Trans. Magn., vol. Mag 19 (Sep. 1983), pp. 1611–1613, 1617–1619.
IEEE Trans. Magn., vol. Mag 20 (Sep. 1984), pp. 657–662, 675–680.
Feinwerktechnik und Messtechnik (Mar. 1980), pp. 53–59.
Siemens Zeitschrift (1978), 434–437.

*Primary Examiner*—A. J. Heinz
*Attorney, Agent, or Firm*—Kenyon & Kenyon

[57] ABSTRACT

A magnetic memory comprising a thin-film magnetic head as well as a recording medium which is provided with a storage layer that can be magnetized perpendicularly (vertically). The magnetic head comprises two magnet legs having a magnetic layer each, the magnetic poles of which are arranged in tandem, forming a gap therebetween. With this magnetic head, a write and read function with high efficiency is obtained. It is provided for this purpose that at least one magnetic layer of the trailing magnet leg differs at least in its end region with respect to its magnetic behavior (magnetic resistance; saturation magnetization) from the at least one magnetic layer of the leading magnet leg at least in its end region, and that the coercivity of the material of the storage layer of the recording medium is chosen sufficiently high, so that overwriting of the storage layer of the recording medium by the trailing magnet leg is, at least largely, eliminated.

22 Claims, 4 Drawing Sheets

FIG 3          $|H_{s2}| \leq 2H_c - H_{s1}$

MAGNETIC MEMORY INCLUDING A RECORDING DEVICE AND MEDIUM THAT CAN BE MAGNETIZED VERTICALLY

BACKGROUND OF THE INVENTION

The present invention relates to a magnetic memory device comprising a thin-film magnetic head constructed in layers on a nonmagnetic substrate for use with a recording medium which is provided with a magnetizable storage layer of a material with predetermined coercivity, in which information can be written along a track by perpendicular (vertical) magnetization of the layer, where the magnetic head contains a magnetic conduction body which is similar to a ring head and carries the magnetic flux with two magnet legs, each of which comprises at least one magnetic layer with predetermined magnetic behavior. Further, the magnetic poles facing the recording medium are arranged in tandem as seen in the (relative) direction of motion of the head, a gap of predetermined width being formed between the poles, and outside the pole region an intermediate space is defined between the legs, through which the turns of the writing and/or reading coil winding extend.

A corresponding magnetic head of such a memory can be seen, for instance, from European Patent Application No. 0 012 912 A1. With this head, information can be stored by vertical magnetization of an appropriate recording medium. This principle is generally known (see, for instance, "IEEE Transactions on Magnetics", Vol. MAG-16, No. 1, Jan. 1980, pages 71 to 76, or Vol. MAG-20, No. 5, Sept. 1984, pages 657 to 662 and 675 to 680). The recording media which are to be provided and are frequently also designated in principle as vertical magnetization can be provided in the form of rigid magnetic memory discs, individual flexible discs (floppy discs) or magnetic tape. These media comprise at least one magnetizable storage layer of predetermined thickness which contains a magnetically anisotropic material of predetermined coercivity, especially of a CoCr alloy. The axis of the so-called easy magnetization of this layer is oriented perpendicularly to the surface of the medium. By means of special magnetic heads, information can then be written in along a track as bits in successive sections by appropriate magnetization of the storage layer.

The combined read and write magnetic heads known for the principle of so-called longitudinal magnetization, however, cannot be applied directly to vertical magnetization. Although, if these heads are used, wherein the magnetic conduction body formed by the magnet legs generally has a shape similar to a ring head, the magnetic flux desired for utilizing the principle of vertical magnetization, to form a circuit closed as far as possible with low magnetic resistance, can be obtained, it is difficult to generate a sufficiently strong writing field at high bit densities and due to this, with a correspondingly small length of the so-called air gap which is formed between the magnetic poles of the ring head facing the recording medium.

One is therefore compelled to develop special magnetic write-read heads for the principle of vertical magnetization. The design of such a head can be seen, for instance, from the European Patent Application cited above. This known magnetic head comprises a so-called conduction body for conducting the magnetic flux. This magnetic conduction body is formed by two magnet legs which consist of at least one layer of a magnetic material with predetermined specific magnetic properties or magnetic behavior such as of a special NiFe alloy (for instance, "Permalloy"; Trade Mark of "Bell Telephone Manufacturing Company"). With the end regions facing the recording medium, two magnetic poles are formed which are arranged in tandem as seen in the direction of relative motion of the head and medium and with a predetermined small gap width relative to each other. These end regions are followed by a region of the head in which the magnet legs are brought to a larger mutual spacing. In this manner, a sufficiently wide space between the magnetic legs is obtained, through which the turns of a write and read coil winding extend. For the writing function as well as for the reading function of this magnetic head, the ring-head-like form of its magnetic conduction body with both magnetic legs is utilized.

The individual parts of this known magnetic head are applied by a thin-film technique to the flat back side of a nonmagnetic substrate. This technique is generally known for magnetic write/read heads (see, for instance, "Feinwerktechnik und Messtechnik", Vol. 88, No. 2, Mar. 1980, pages 53 to 59, or "Siemens-Zeitschrift", Vol. 52, No. 7, 1978, pages 434 to 437). However, the generation of sufficiently strong write fields while maintaining at the same time high resolution for reading is a problem in such magnetic thin-film heads. These two requirements are basically contradictory, since generally strong magnetic fields can be obtained only with large gap width and/or large pole thicknesses, while high resolution for high bit density can be achieved only with small gap width and/or small pole thicknesses (see, for instance, "IEEE Transactions on Magnetics", Vol. MAG-19, No. 5, Sept. 1983, pages 1617 to 1619). In addition, the writing field should be as asymmetrical as possible in a magnetic head for vertical recording in order to raise the vertical component of this field at the trailing edge of the writing magnetic pole and to attenuate the vertical component of opposite polarity at the leading edge of the other magnet pole. In the known magnetic head type, the magnetic field at the trailing edge is generally somewhat weaker than the magnetic field at the leading edge.

SUMMARY OF THE INVENTION

It is therefore an object of the present invention to improve the magnetic memory device of the type mentioned above such that with its magnetic head a writing and reading function with always relatively high efficiency by the principle of vertical magnetization is made possible. In this connection, consideration should be given to the mentioned requirements with respect to strong writing fields and high resolution, at least to a large degree.

The above and other objects of the present invention are achieved by a magnetic memory device comprising a thin-film magnetic head built up layer-wise on a nonmagnetic substrate and a recording medium which is provided with a magnetizable storage layer of a material with predetermined coercivity, into which information can be written along a track by perpendicular (vertical) magnetization of the layer, where the magnetic head contains a magnetic ring head-like conduction body for carrying the magnetic flux having two magnet legs, each of which comprises at least one magnetic layer with predetermined magnetic behavior, the magnet legs having poles facing the recording medium and being arranged in tandem as viewed in a direction of relative motion of the head and medium, whereby a gap of predetermined width is formed, said magnet legs defining outside of the pole region a space, through which the turns of a write and/or read coil winding extend, at least the one magnetic layer of the magnet leg trailing as viewed in the direction of relative motion differs at least in its end region forming the magnetic pole with respect to its magnetic behavior from the at least one magnetic layer of the leading magnet leg, at least in its end region forming the magnetic pole, and the coercivity of the material of the storage layer of the recording medium is chosen high enough so that overwriting the storage layer of the recording medium by the magnetic field which can be brought about at the magnetic pole of the trailing magnet leg is substantially eliminated.

As a characteristic magnetic behavior of the respective magnetic layers can be regarded, at least in its end regions forming one magnetic pole, particularly the magnetic resistance (reluctance) of the layer or the saturation magnetization of the layer material.

The advantages accompanying this embodiment of the magnetic memory device are in particular that in writing, the magnetization of the magnetic layer of the trailing magnet leg is lowered in its pole area as compared to the magnetization of the magnetic layer of the leading leg, and that therefore also the vertical component of the magnetic field of the trailing leg is accordingly smaller than the vertical field of the leading magnetic pole. This means that the magnetic head writes with a very steep transistion (slope) of the magnetic field formed between the two magnetic poles. Thereby, also the magnetic transition layer which is important for the read amplitude, is greatly shortened as compared to the customary writing with the trailing edge. The magnetic head of the memory device according to the invention therefore writes with its leading magnetic pole due to the different magnetic behavior of its leg, in deviation from known heads. This can be ensured particularly by the provision that for the storage layer of the recording medium, a material with a valve of the (vertical) coercitive field strength is chosen so high that the magnetic field of the trailing magnet pole is no longer sufficient to write this memory layer. On the other hand, the magnetic head behaves for reading like a conventional thin-film ring head due, as is known, to the weaker fields which record a very steep magnetic transition with an accordingly large reading voltage. It is, in addition, particularly advantageous that the gap width in the magnetic head of the memory device according to the invention can be kept very small without substantial adverse effects on the writing properties and that accordingly, the maximally attainable bit density is correspondingly high.

BRIEF DESCRIPTION OF THE DRAWINGS

For a further explanation of the invention, reference is made to the drawings, in which.

DETAILED DESCRIPTION

Figure 1:
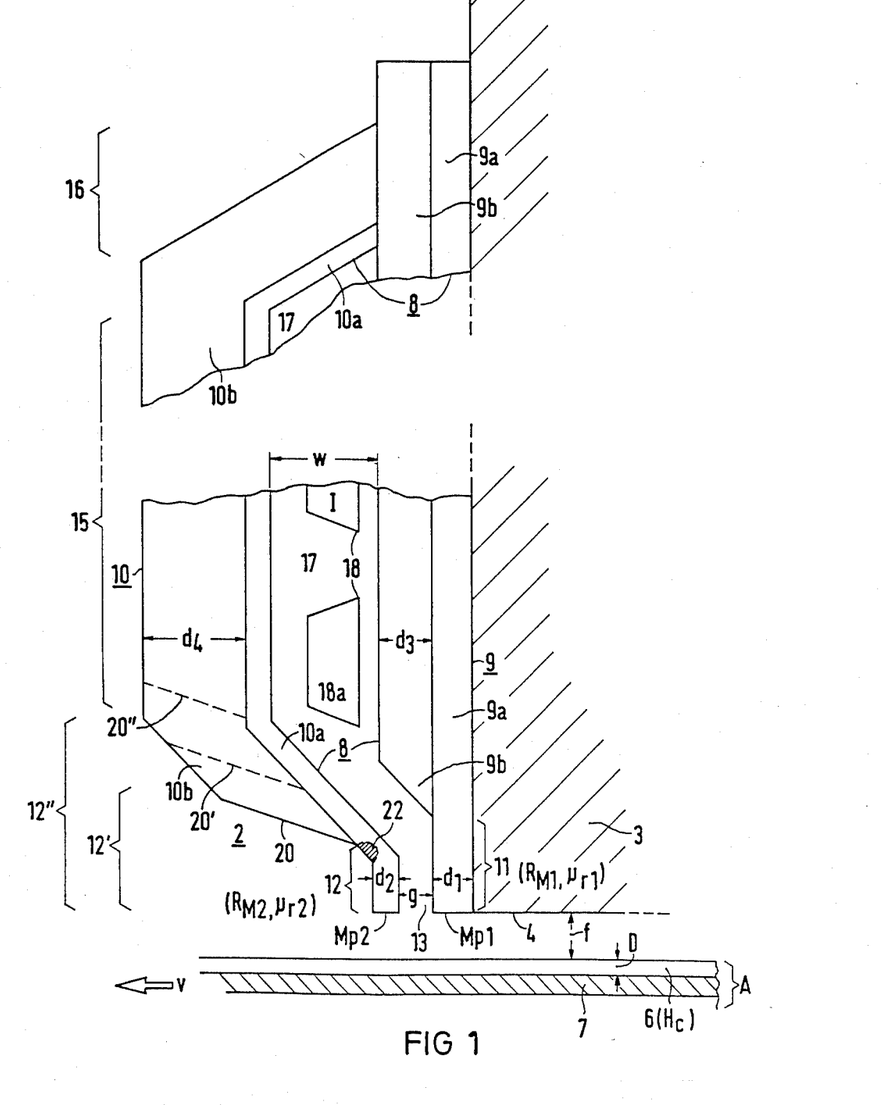
FIG. 1 shows schematically an embodiment of a memory device according to the invention.

In the magnetic head, shown only in part as a longitudinal section in FIG. 1, of a first memory device according to the invention, embodiments known as similar to ring heads with layer-wise design are taken as a starting point, such as have been developed for the principle of vertical magnetization (see, for instance, the European Patent Application mentioned above.) It should be possible to execute a write as well as a read function with the magnetic head generally designated with 2. This head is located on a flat side of a nonmagnetic substrate 3 which forms the end face and in particular the back side of a conventional element, also designated as the aerodynamic body, and which is not detailed in the figure. The magnetic head can be guided at a small altitude f relative to a recording medium A known per se, the direction of motion of the recording medium relative to the magnetic head being indicated by arrow v. The flying altitude f which adjusts itself between at least one runner (skid) facing the recording medium A of the head 2 and the recording medium is, for instance, only some $10^{-7}$ m. The recording medium, for instance, a magnetic storage disc, has a storage layer 6 which is oriented vertically and has a predetermined thickness D. The material of the storage layer, for which, for instance, a CoCr alloy is chosen, should have here a predetermined high value of the (vertical) coercive field strength $H_c$, of, for instance, more than 60 kA/m (see, for instance European Patent Application No. 0 120 413 A1 or European Patent Application No. 0 054 269 A2).

The storage layer 6 can advantageously further be arranged on at least one further magnetically soft layer, for instance, of a special NiFe alloy or of amorphous CoZr or CoHf which may optionally further have tertiary additions such as of Ni or Nb. This sublayer is designated with 7 in the figure.

The magnetic head 2 contains a magnetic conduction body 8 which is similar to a ring head and carries the magnetic flux, with two magnet legs 9 and 10. These legs are largely and in particular in their end regions 11 and 12 which are facing the recording medium A and form magnetic poles Mp1 and Mp2, oriented at least approximately perpendicularly to the surface of the recording medium. The end regions are understood here to be the thin end section of a magnet let which has an at least largely uniform transverse extent or thickness or is not reinforced by any further layers. The end regions 11 and 12 are physically separated by an air gap 13 which has in the vicinity of the magnetic poles Mp1 and Mp2 an advantageously small longitudinal width g of less than 1 μm and in particular less than 0.5 μm and preferably less than 0.25 μm, i.e., in the direction of relative motion v of the magnetic head. In a central region 15 of the magnetic conduction body 8, the spacing between the two magnet legs 9 and 10 which is increased over this gap width g in that the magnet leg 10 which is backwards relative to the direction of motion v, i.e., the trailing magnet leg 10 leads to a larger width w relative to the frontward magnet leg 9 which is flat and faces the substrate 3. Outside of this region 15, the magnet leg 10 is added on the side of the conduction body 8 facing away from the recording medium A in a manner known per se, to the magnet leg 9 in a junction region 16, so that the ring-head-like shape of the conduction body 8 is obtained.

Through the space 17 formed between the two magnet legs 9 and 10 in the central region 15, at least one flat coil winding 18 extends which can serve as a write as well as a read coil. This winding which is indicated in the figure only by a single layer 18a can also be designed with several layers and in general has a relatively large number of turns. A relatively large writing current I can flow through it.

The two magnet legs 9 and 10 of the magnetic head 2 are each formed by at least one magnetic layer 9a and 10a with a layer thickness $d_1$ and $d_2$ respectively. The respective layer thickness is understood here to mean the extent of the corresponding layer in the direction of motion v prevailing in the respective pole region 11 and 12. According to the invention, these magnetic layers should have different magnetic resistance at least in the vicinity of their poles 11 and 12, where the layer 10a of the magnet leg 10 which is trailing as seen in the relative direction of motion, is to have the substantially higher magnetic resistance $R_{M2}$ which is preferably higher by at least a factor 2. The relatively smaller magnetic resistance of the layer 9a of the leading magnet leg 9 is designated here with $R_{M1}$. The magnitude of the magnetic resistance of the respective magnetic layer depends here, as is well known, on the reversible permeability $\mu_r$ and the geometry of the respective layer. The reversible permeability of the layers can be determined by the choice of material and the production conditions, for instance, for sputtering. Preferably, a material is chosen for the magnetic layer 9a of the leading magnet leg 9 with a reversible permeability $\mu_{r1}$ which is larger than the reversible permeability $\mu_{r2}$ of the magnetic layer 10a of the trailing magnet leg. Advantageously, the higher permeability $\mu_{r1}$ should have a value above 1000 and preferably over 3000, while the value of the smaller permeability $\mu_{r2}$ should in general be less than 1000 and, for instance, approximately 500. Preferably, materials are chosen, the reversible permeabilities of which differ by at least a factor 3.

In addition, the magnetic resistance of the magnetic layers 9a and 10a can be varied by a suitable choice of the layer thicknesses d1 and d2 of the magnetic layers. These layer thicknesses should be smaller than 2 $\mu$m and in particular, smaller than 1 $\mu$m and preferably smaller than 0.7 $\mu$m. Optionally, a value of the thickness d1 is provided for the magnetic layer 9a of the leading magnet leg 9 which is larger than the value of the thickness d2 of the magnetic layer 10a of the trailing magnet leg 10. For bit densities above 30 kFCI (kilo flux changes per inch), for instance, d1 can be chosen smaller than 0.6 $\mu$m, d2 smaller than 0.4 $\mu$m and g smaller than 0.25 $\mu$m. The flying altitude f and the thickness D of the CoCr storage layer 6 should satisfy in this case the inequality $f+D<0.5$ $\mu$m. In addition, the thickness of a magnetically soft sublayer 7 should not be substantially smaller than the thickness of the thicker of the two magnetic poles Mp1, Mp2.

As can further be seen from FIG. 1, each of the magnet legs 9 and 10 can be provided outside the respective end regions 11 and 12 with an additional relatively thick magnetic layer 9b and 10b, respectively, where these layers cover up particularly the central region 15 of the magnetic conduction body 8 with the coil winding 18. The thicknesses of these additional layers 9b and 10b are designated with $d_3$ and $d_4$. The layers 9b and 10b do not reach the respective magnetic poles Mp1 and Mp2, but end a predetermined distance therefrom. Thus, they fix the upper limits of the end regions 11 and 12. Accordingly, the end region 12 of the magnet leg 10 begins at the point where the outside of the magnetic layer 10b designated with 20 abuts the outside of the magnetic layer 10a. As is further indicated in the figure by dashed lines 20' and 20", the outside of the magnetic layer 10b can also end retracted further, so that then, the end region of the magnetic layer 10a is more extensive accordingly. These end regions bounded by the outside surfaces 20' and 20" are designated with 12' and 12", respectively. The additional layers 9b and 10b can thus serve advantageously for influencing the magnetic resistance of the respective magnet leg and can also be utilized for the desired asymmetry of the field pattern of the writing field. Thus, different layers of the outsides 20, 20', 20" or different dimensions of the magnetic layer 10b relative to the recording medium A have a great influence on the write/read behavior of the magnetic head 2. Thus, shorter legs, for instance, lead to better write fields but to smaller read amplitudes.

A further possibility for increasing the magnetic resistance of the trailing magnet leg 10 is due to the provision of reducing the cross section in the magnetic layer 10a, increasing the magnetic resistance. This reduction of the cross section can preferably be located at the edge of the end region 12 or 12' or 12" facing the central region 15. According to the embodiment shown, such a resistance increase can be achieved by generating, for instance, with ion beam etching of the additional magnetic layer 10b of the leg 10, an etching trench in the magnetic layer 10a, forming the magnetic pole Mp2 of this leg by overetching. The outline of this etching trench is indicated in the figure by a dashed section 22.

The position of the write/read coil winding 18 also has an influence on the saturation behavior of the end pieces 11 and 12; 12', 12" of the magnet legs 9 and 10 with the poles Mp1 and Mp2 and thereby on the magnetic fields that can be generated. Thus, the magnetic fields are larger the closer this winding is located to the gap 13. However, it should be taken into consideration here that with this proximity, the desired asymmetry of the field distribution is partly cancelled again. Thus, a further possibility exists to influence the amplitude as well as the asymmetry of the vertical field by the position of the write/read coil winding 18.

Materials of particular interest for the layers 9a, 9b and 10a, 10b are FeNi alloys such as "Permalloy" or amorphous CoZr or CoHf alloys. Optionally, for instance, ternary partners can further be added to the alloying partners of these amorphous alloys.

Due to the different magnetic resistance conditions which can be so adjusted in the two magnet legs 9 and 10, especially in their corresponding end regions 11, 12, 12', 12", it can then be achieved that the write function is exerted for all practical purposes only by the magnetic pole Mp1 of the leading magnet leg 9. In order to assure this characteristic mode of operation of the magnetic head 2, i.e., to at least largely prevent overwriting information written by the leading magnet leg 9 by the trailing magnet leg 10, it is furthermore provided in the magnetic memory device according to the invention that the magnetic field of the trailing pole Mp2 is no longer sufficient for reversing a magnetization of the written information. The corresponding field condition can be seen in greater detail from the diagram of FIG. 2. The absolute value of the coercivity $H_c$ should, for instance, be at least 20 kA/m and preferably at least 60 kA/m.

Figure 2:
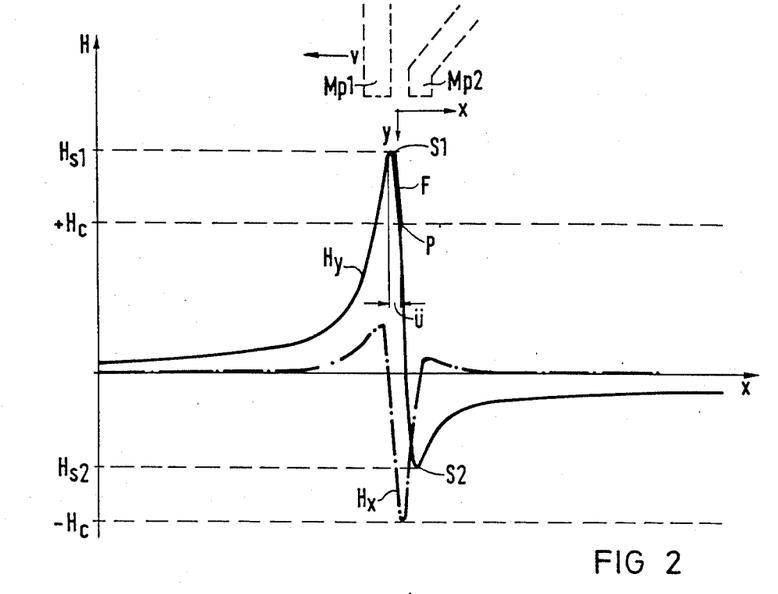
FIG. 2 shows a diagram of the vertical magnetic field components generated by the magnetic head of this memory device according to FIG. 1.

In this diagram, the field strength H of the magnetic field generated by the two magnetic poles Mp1 and Mp2 is plotted as a function of the dimension x of the magnetic head pointing in the direction of motion v. In the diagram, the contours of these magnetic poles are indicated only schematically and not to scale. The resulting field strength H plotted along the ordinate is measured at the surface of the recording medium A in the direction of the normal (y-direction). As can be seen from the diagram, the field strength curve $H_Y$ has a pronounced (positive) maximum substantially ascribed to the leading magnet pole which quite clearly exceeds the corresponding (positive) switching field "+$H_c$" of the storage layer 6. This switching field "+$H_c$" indicated by a dashed line, is understood here to mean that magnetic field which is just sufficient to cause a reversal of the magnetization of the storage layer 6. In the ideal case, this switching field corresponds to the corresponding coercivity field strength of the material of the storage layer; in general, however, it deviates therefrom by a small factor. In the diagram, however, the ideal case is assumed, in which the switching field is set equal to the coercivity field strength $H_c$. As can furthermore be seen in the diagram, the field strength curve $H_Y$ exhibits between the peak S1 ascribed to the leading magnetic pole Mp1 with $H_{s1}$ and the intersection P with the switching field "+$H_c$" advantageously a very steep slope. This means that the magnetic head writes with this very steep characteristic F emphasized in the diagram by a bolder field strength curve, between the magnetic poles Mp1 and Mp2. This means that the so-called magnetic transition length Ü which represents the extent of this characteristic F in the x direction is substantially shortened from writing, known so far, with the trailing edge of known magnetic heads. In addition, the diagram shows the fact that writing of the trailing magnetic pole Mp2 is practically impossible. The course of the field strength curve $H_y$ ascribed to this magnetic pole has as its negative peak S2, a minimum value Hs2 which is located quite substantially above the negative switching field "−$H_c$" shown as a dashed line. This means that the field strength curve $H_y$ does not intersect this line. For the storage layer 6 of a recording medium A of the memory according to the invention, a material must therefore be chosen which exhibits a correspondingly high switching field. Appropriate materials for this purpose are generally known (see, for instance, the cited European Patent Application Nos. 0 120 413 or 0 054 269). In the diagram, a dashed dotted line furthermore shows the field strength curve $H_x$ of the (longitudinal) field component formed in the direction of motion v.

According to the course of the curve of the diagram in FIG. 2, a magnetic head 2 was taken as the starting point, the writing current I of which causes a maximum $H_{s1}$ of the magnetic pole Mp1 of the leading magnet leg and a minimum $H_{s2}$ of the magnetic pole Mp2 of the trailing magnet leg. In contrast thereto, a field pattern which is similar but mirrored at the x axis is obtained for a writing current with the reverse flux direction.

Figure 3:
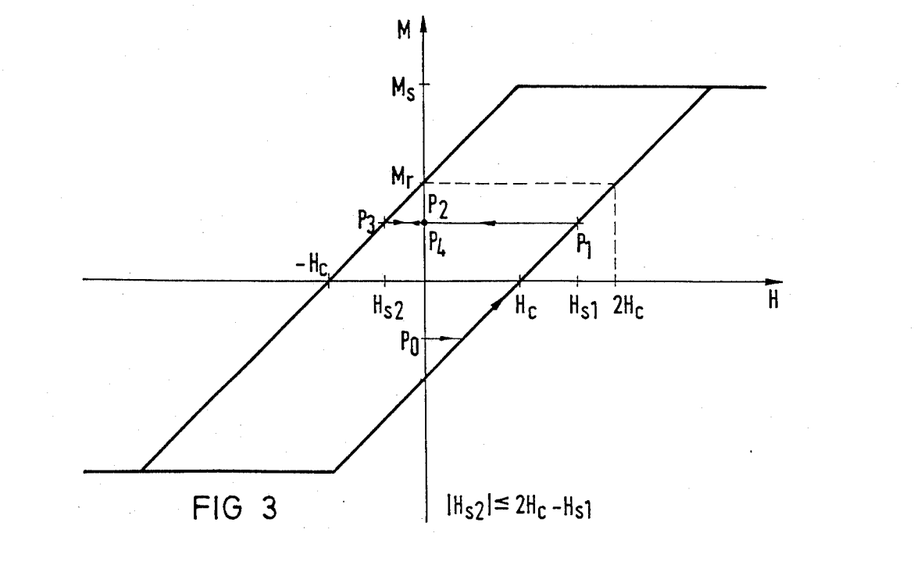
FIG. 3 shows the corresponding magnetizing conditions indicated in a further diagram.

The magnetization conditions corresponding to the curve in FIG. 2 are indicated in the diagram of FIG. 3. For simplifying the description, a recording medium with only an ideal vertical thin storage layer 6, a so-called single layer, is assumed. In this figure, the magnetization shear curve is given, wherein the magnetization M is plotted on the ordinate and the field strength H in arbitrary units on the abcissa. For such a thin layer 6 of a material with a saturation magnetization $M_s$, the demagnetization factor N in the direction of the normal to the layer is exactly N=1; i.e., the remanence $M_r$ and the coercivity $H_c$ are equal in this case: $M_r = H_c$. Prior to the start of the writing operation, the point to be written on is located on the hystersis curve at the point $P_O$. The magnetic head moving relative to the storage cell then magnetizes first the leading magnetic pole Mp1 with the maximum writing field strength $|H_{s1}| > H_c$, in the opposite direction so that the magnetization travels to the point $P_1$ along the the hysteresis curve. The polarity of the vertical field between the two magnetic poles Mp1 and Mp2 is then reversed, in the course of which the point $P_2$ on the ordinate is traversed, and finally assumes the negative value of the amount $|H_{s2}|$ with $|H_{s2}| < H_c$.

In the course of this, the point $P_3$ is reached on the magnetization curve. With the then following field decreases to zero, the reversal of the magnetization and thereby, the writing operation are completed. The corresponding point on the ordinate is designated with $P_4$. It coincides with the point $P_2$. Since the magnitude of the read signal is proportional to the magnetization at this point $P_4$, the vertical field of the trailing magnet pole Mp2 must fulfill the inequality:

$$|H_{s2}| \leq 2 H_c - |H_{s1}|.$$

In this formulation of the inequality it is also taken into consideration that with the reverse current direction of the write current I, $H_{s1}$ becomes negative and $H_{s2}$ positive.

For the diagram of FIG. 3, a recording medium A with a single layer as the storage layer 6 was assumed. If a double-layer storage medium is used which exhibits in addition to the storage layer 6 consisting particularly of CoCr, a soft magnetic substrate 7, for instance, of NiFe, CoZr, CoHf, etc. it should additionally be taken into consideration that all critical dimensions given in FIG. 1: g, ($d_1+g/2$), ($d_2+g/2$), (f+D) depend on the minimum flux change wave length (see "IEEE Transactions on Magnetics", Vol. MAG-19, No. 5, 1983, pages 1611 to 1613). The advantages of such a double layer 6, 7 over a single layer are the substantially larger vertical fields for writing which are heavily preferred by the magnetically soft substrate 7 at the expense of an undesirable horizontal field. The magnetic layer is remagnetized in the process substantially more deeply and sharply and the read signal is distinctly increased thereby to advantage.

Figure 4:
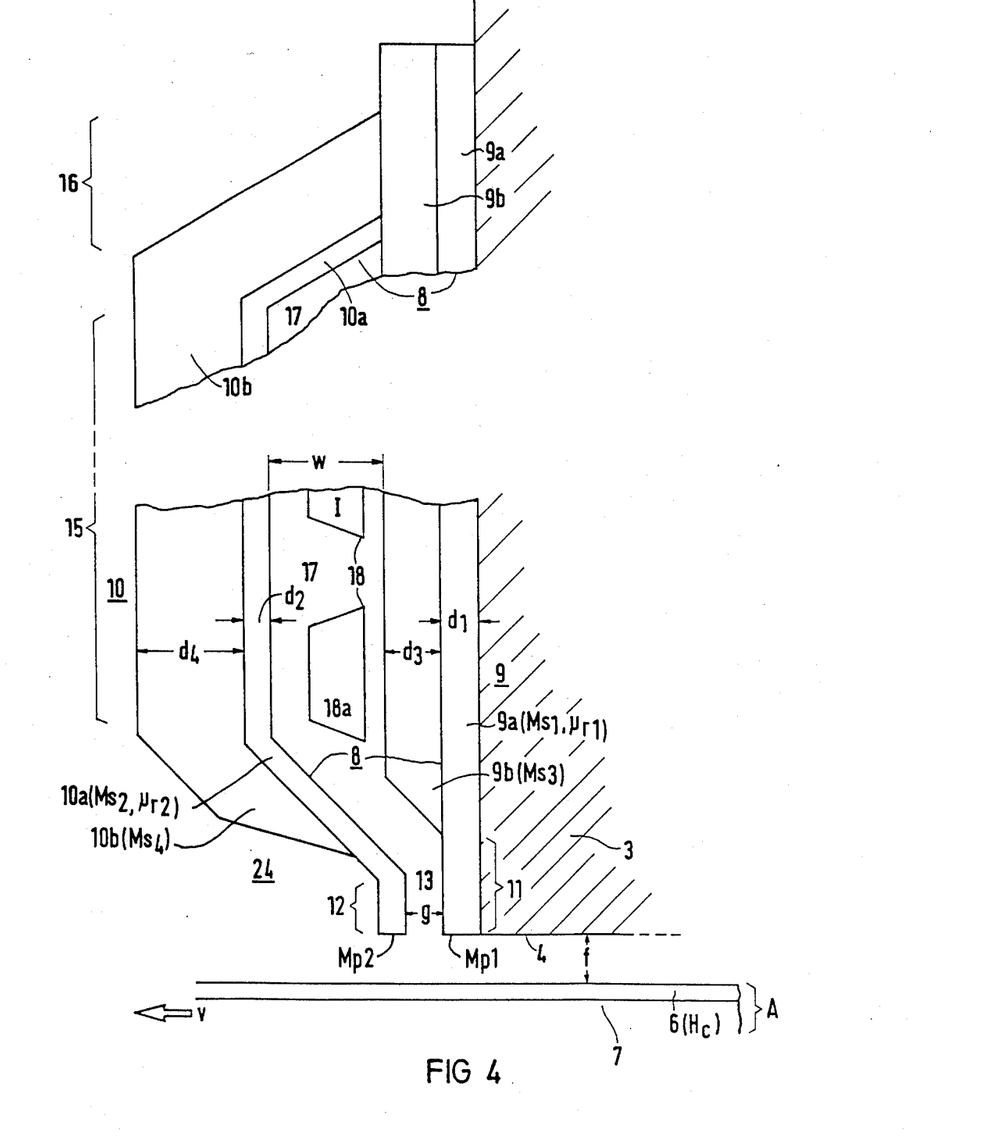
FIG. 4 shows another embodiment of a memory device according to the invention.

The magnetic head, shown in FIG. 4 only partially as a longitudinal section, of a further memory device according to the invention exhibits a design which largely corresponds to the design of the head 2 shown in FIG. 1. In the figures, identical parts are therefore provided with the same reference symbols. The two magnet legs 9 and 10 of this magnetic head designated with 24 are likewise designed as at least one magnetic layer 9a and 10a with a layer thickness $d_1$ and $d_2$, respectively. In contrast to the embodiment according to FIGS. 1 to 3, the measures according to the invention regarding the magnetic behavior of the individual magnet leg is not to relate to their magnetic resistance, but to the saturation magnetization of their material. Accordingly, materials with different saturation magnetization Ms are to be chosen for the magnetic layers according to the invention in the embodiment according to FIG. 4, where the material of the layer 9a of the magnet leg 9 leading as seen in the relative motion direction v should have the higher saturation magnetization $Ms_1$. The relatively smaller saturation magnetization of material of the layer 10a of the trailing magnet leg 10 is designated here with $Ms_2$. The values of the saturation magnetizations $Ms_1$ and $Ms_2$ should differ in particular by a factor of at least 1.4. As materials for the layers 9a and 10a can be considered particularly alloys such as "Permalloy" or amorphous CoZr or CoHs alloys. Advantageously, the higher saturation magnetization $Ms_1$ should have a value above 1000 kA/m and preferably above 1100 kA/m while the value of the smaller saturation magnetization $Ms_2$ is, for instance, smaller than 900 kA/m and preferably smaller than 800 kA/m. "Permalloy", for instance, has a saturation magnetization in the order of 800 kA/m, while the saturation magnetization of the mentioned amorphous binary materials is in the order of 1100 kA/m. Optionally, also ternary amorphous alloys with a high saturation magnetization $Ms_1$ can be considered. The saturation magnetizations Ms of the individual layers can be influenced here in a manner known per se by the production conditions or by the choice of the alloy composition.

As can further be seen from FIG. 4, each of the magnet legs 9 and 10 can be provided outside of the region occupied by the end regions 11 and 12, with an additional relatively thick magnetic layer 9b and 10b, where these layers cover in particular the central region 15 with the coil winding 18. The thicknesses of these additional layers 9b and 10b are designated with $d_3$ and $d_4$. These additional layers can advantageously serve for reducing the magnetic resistance in the magnetic conduction body 8 and can further be used for the desired asymmetry of the field pattern of the write field.

This desired asymmetry is achieved particularly by a suitable choice of the thicknesses of the individual magnetic layers as well as of the saturation magnetizations of their materials. Thus, the layer thickness $d_1$ of the magnetic layers 9a of the leading magnet layer 9 with the high saturation magnetization $Ms_1$ can advantageously and optionally be chosen larger than the layer thickness $d_2$ of the magnetic layer 10a with the lower saturation magnetization $Ms_2$ of the trailing magnet leg 10. In addition, a material can be provided for the additional magnetic layer 9b of the leading magnet leg 9, the saturation magnetization $Ms_3$ of which is greater than the saturation magnetization $Ms_4$ of the material of the additional magnetic layer 10b of the trailing magnet leg 10. According to the embodiment shown, it will be assumed that the same materials are provided for the magnetic layers 9b and 10b as those of the respectively adjoining layers 9a and 10a, so that we then have: $Ms_3 = Ms_1$ and $Ms_4 = Ms_2$. However, materials with saturation magnetization deviating therefrom can also be chosen.

It is particularly advantageous to provide, at least for some of the individual magnetic layers of the magnetic head 24 shown in FIG. 4, materials which exhibit besides predetermined saturation magnetization, also different permeabilities. In the following, the reversible permeability $\mu_r$ of the materials is assumed. Thus, a material can be chosen especially for the magnetic layer 9a defining the gap 13 of the leading magnet leg 9, the permeability $\mu_{r1}$ of which is larger than the permeability $\mu_{r2}$ of the magnetic layer 10a defining the gap 13 of the trailing magnet leg 10. Since because of these measures the layer 10a can no longer take up additional flux if the write currents I are large, a further increase of the write current I leads to the condition that the magnetic layer 9a of the other magnet leg 9 of the material with the substantially higher saturation magnetization $Ms_1$ performs the write function. In reading, on the other hand, the magnetic fields emanating from the storage layer 6 of the recording medium A are relatively small, as is well known, so that the latter cannot drive the magnetic layer 10a of the material with the lower saturation magnetization $Ms_2$ into saturation. Consequently the read function is performed therefore also with this magnetic layer, which means, however, that for reading, the magnetic head 24 operates as an ordinary-ring head with the well-known high efficiency.

In order to assure this characteristic operation of the magnetic head 24, i.e., to prevent overwriting of information written by the leading magnet leg 9 by the trailing magnet leg 10, it is likewise provided in this magnetic memory device according to the invention that the coercivity $H_c$ of the storage layer 6 of the recording medium A is chosen so high that the magnetic field of the trailing pole Mp2 is no longer sufficient to write on the storage cell 6. The corresponding field conditions can be read in greater detail from the diagram of FIG. 5. The absolute value of the coercivity should be, for instance, at least 20 kA/m and preferably at least 60 kA/m.

Figure 5:
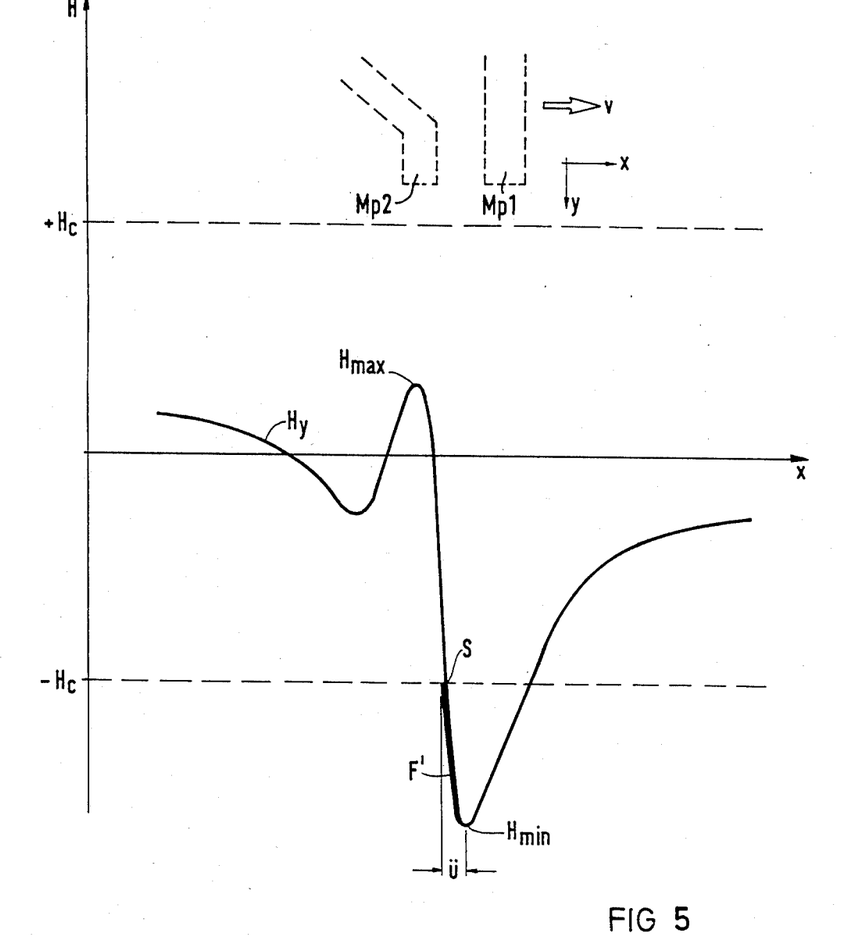
FIG. 5 is a diagram of the vertical magnetic field component generated by the magnetic head of this memory device.

In the diagram of FIG. 5, the field strength H of the magnetic field generated by the two magnetic poles Mp1 and Mp2 is shown as a function of the extent x of the magnetic head pointing in the direction of motion v. The field strength is measured here at the surface of the recording medium in the direction of the normal (y-direction). In addition, the outlines of the leading pole Mp1 and of the trailing pole Mp2 are indicated in the diagram schematically and not to scale. As can be seen from the diagram, the field intensity curve $H_y$ has a pronounced (negative) maximum ascribed substantially to the leading magnet pole Mp1 which falls quite distinctly below the corresponding (negative) switching field $(-H_c)$ of the storage layer 6. The switching field $(-H_c)$ indicated by a dashed line is understood here to be that magnetic field which is just sufficient to cause a reversal of the magnetization in the storage layer 6. In the ideal case, this switching field corresponds to the coercivity of the material of the storage layer; generally, however, it deviates therefrom by a small amount. In the diagram, however, the ideal case is assumed, in which the switching field is set equal to the coercivity field strength $H_c$. As can further be seen from the diagram, the field intensity curve advantageously has a very steep slope between the minimum $H_{min}$ and the intersection S with the switching field $(-H_c)$. This means that the magnetic head with this very steep slope F' emphasized in the diagram by a bolder field strength curve between the magnetic poles Mp1 and Mp2, i.e., the so-called magnetic transition distance U which represents the extent of this slope F' in the x direction, is substantially shortened as compared to the writing, known to date, of known magnetic heads with the trailing edge. In addition, the fact can be seen from this diagram that writing with the trailing magnet head Mp2 is practically impossible. The course of the field strength curve ascribed to this magnetic pole shows a maximum $H_{max}$ which is quite substantially lower than the corresponding switching field $(+H_c)$ shown by a dashed line, i.e., a material must be chosen for storage layer 6 of the recording medium A of the memory according to the invention, which has a coercivity field strength H$_c$ resulting in a correspondingly strong switching field. Appropriate materials are generally known (see, for instance, the cited European Patent Application Nos. 0 120 413 or 0 054 269).

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A magnetic memory device including a thin-film magnetic head built up layer-wise on a nonmagnetic substrate and further including a recording medium which is provided with a magnetizable storage layer of a material with predetermined coercivity, into which information can be written along a track by perpendicular (vertical) magnetization of this layer, the magnetic head comprising a magnetic ring head-like conduction body for carrying magnetic flux, the conduction body having two magnet legs, each magnet leg comprising at least one magnetic layer with predetermined magnetic behavior, each magnet leg having a magnet pole facing the recording medium, said magnet poles arranged in tandem as viewed in a direction of relative motion of the head and medium, whereby a gap of predetermined width is formed between said poles, said magnet legs defining outside of a region of the poles a space, through which the turns of a write and/or read coil winding extend, the magnet leg trailing as viewed in the direction of relative motion having an end region forming a first magnetic pole and the leading magnet leg having an end region forming a second magnetic pole, said magnet legs differing at least in their end regions with respect to their magnetic behavior, the storage layer of the recording medium comprising a material with a coercivity chosen to have a sufficiently high value so that overwriting the storage layer of the recording medium by the magnetic field which can be brought about at the magnetic pole of the trailing magnet leg is substantially eliminated.

2. The memory device recited in claim 1, wherein the magnetic layer of the trailing magnet leg has at least in its 3. The memory device recited in claim 2, wherein the storage layer comprises a material having a coercivity having a predetermined value so that the relation applies: $|H_{s2}| \leq 2H_c - |H_{s1}|$ where $H_{s1}$ is a crest value of the vertical component of the magnetic field generated by the magnetic head at the surface of the storage layer and associated with the magnetic pole of the leading magnet leg, where $H_{s2}$ is a crest value of the vertical component of the magnetic field generated by the magnetic head at the surface of the storage layer and associated with the magnetic pole of the trailing magnetic leg, and where $H_c$ is the coercivity of the material of the storage layer.

4. The memory device recited in claim 2, wherein the magnetic layers of the magnet legs have in their end regions forming the magnet poles magnetic resistances having values which are different by at least a factor 2.

5. The memory device recited in claim 2, wherein the magnetic layer forming the magnetic pole of the trailing magnet leg preferably at the end of its end region facing away from the recording medium, has a reduced cross section increasing the magnetic resistance.

6. The memory device recited in claim 1, wherein the leading magnet leg comprises at least in the region of the magnetic pole at least one magnetic layer of a material of predetermined high saturation magnetization which is comparatively higher than the saturation magnetization of the material of the trailing magnet leg in the region of its magnetic pole, so that at least the region of the magnetic pole of the trailing magnet leg is driven into magnetic saturation during the write function due to a write current flowing in the coil winding.

7. The memory device recited in claim 6, wherein at least one of the magnet legs of the magnetic head comprises, in addition to the one first magnetic layer of the material with predetermined saturation magnetization, at least one additional magnetic layer outside the region of its magnetic pole.

8. The memory device recited in claim 6, wherein the magnetic layer forming the magnetic pole of the leading magnet leg comprises a material having a saturation magnetization of at least 1000 kA/m and preferably of more than 1100 kA/m.

9. The memory device recited in claim 6, wherein the magnetic layer of the trailing magnet leg forming the magnetic pole comprises a material having a saturation magnetization of less than 900 kA/m and preferably less than 800 kA/m.

10. The memory device recited in claim 6, wherein the magnetic layer of the leading magnet leg forming the magnetic pole comprises a material having a saturation magnetization having a value which is at least higher by a factor 1.4 than the value of the saturation magnetization of the material of the magnetic layer of the trailing magnet leg forming the magnetic pole.

11. The memory device recited in claim 6, wherein the two magnet legs of the magnetic head each have an additional magnetic layer comprising materials with different saturation magnetizations, where the saturation magnetization of the additional magnetic layer of the leading magnet leg is greater than the saturation magnetization of the additional magnetic layer of the trailing magnet leg.

12. The memory device recited in claim 1, wherein the feature that the magnetic layers of the two magnet legs have at least in their regions forming the respective magnetic pole, a layer thickness measured in the direction of relative motion, which is smaller than 2 μm, in particular, smaller than 1 μm and preferably smaller than 0.7 μm.

13. The memory device recited in claim 1, wherein the feature that the magnetic layer of the leading magnet leg has, at least in its end region forming the magnetic pole, a layer thickness to be measured in the direction of motion, which is larger than the thickness which the magnetic layer of the trailing magnet leg has, at least in its end region forming the magnetic pole.

14. The memory device recited in claim 1, wherein at least some of the magnetic layers of the magnetic conduction body of the magnetic head comprise materials with different reversible permeability.

15. The memory device recited in claim 14, wherein the material of the magnetic layer of the leading magnet leg has, at least in its end region forming the magnetic pole, a higher permeability than the material of the magnetic layer, at least in the corresponding end region, of the trailing magnet leg.

16. The memory device recited in claim 15, wherein the values of the different permeabilities of the two magnet legs differ by at least a factor 2, and preferably by at least a factor 5.

17. The memory device recited in claim 15 wherein the comparatively higher permeability is greater than 1000 and preferably greater than 3000.

18. The memory device recited in claim 15, wherein the comparatively smaller permeability has a value of less than 1000.

19. The memory device recited in claim 1, wherein the two magnet legs of the magnetic head each comprise an additional magnetic layer.

20. The memory device recited in claim 1, wherein the storage layer of the recording medium comprises a material having a coercivity which has an absolute value of at least 20 kA/m and preferably at least 60 kA/m.

21. The memory device recited in claim 1, wherein the storage layer of the recording medium is arranged on a sublayer of magnetically soft material.

22. The memory device recited in claim 21, wherein the sublayer comprises an NiFe alloy or an amorphous CoZr or CoHf alloy.

* * * * *